Feb. 25, 1964 W. E. NELSON 3,122,669

HIGH FREQUENCY TUBE APPARATUS WITH FLUID COOLED TUNER

Original Filed July 17, 1958 2 Sheets-Sheet 1

INVENTOR
WALTER E. NELSON
BY Harry E. Aine
Attorney

Feb. 25, 1964 W. E. NELSON 3,122,669

HIGH FREQUENCY TUBE APPARATUS WITH FLUID COOLED TUNER

Original Filed July 17, 1958 2 Sheets-Sheet 2

INVENTOR
WALTER E. NELSON
BY Harry E. Olive
Attorney 3,122,669
Patented Feb. 25, 1964

3,122,669

HIGH FREQUENCY TUBE APPARATUS WITH FLUID COOLED TUNER

Walter E. Nelson, San Jose, Calif., assignor to Varian Associates, Palo Alto, Calif., a corporation of California Original application July 17, 1958, Ser. No. 749,225, now Patent No. 2,994,009, dated July 25, 1961. Divided and this application May 4, 1960, Ser. No. 26,891
2 Claims. (Cl. 313—24)

The present invention relates in general to high frequency tube apparatus and more specifically, to a novel high frequency, high power velocity modulation tube which is extremely useful for providing a continuous wave output at high average powers and which is easily tunable over a wide frequency range. Such tubes are especially useful as output tubes in tropospheric forward scatter communication links, and for transmitting tubes covering the UHF-TV band. This application is a divisional of by co-pending parent application, Serial No. 749,225, now U.S. Patent 2,994,009 filed July 17, 1958, and issued July 25, 1961, for Improvements in High Frequency Tube Apparatus.

Heretofore multi-cavity klystron amplifiers have been built which would provide high output powers in the order of 15 kw. average. These tubes were tunable over the heretofore relatively wide tuning range of approximately 10 percent. In these high power amplifiers the individual cavities were synchronously tuned by tuning plungers which varied predominately either the capacity or inductive parameters of the cavity.

The present invention provides a high power multicavity klystron amplifier capable of delivering average output powers in the order of 12 or more kw. and at the same time have the greatly enhanced tuning range of approximately 40 percent. The four fold increase in tuning range has been obtained by the use of a novel cavity tuner, claimed in the aforementioned patent, in which both the inductive and the capacitive parameters are varied in a desired manner to tune the cavity. The provision of such a wide tuning range in one klystron amplifier results in substantial savings to the user of these tubes because the number of different tube types required to cover a certain bandwidth is greatly reduced. For example, heretofore, it required six different klystron amplifier tubes to cover the UHF-TV channels, 14–83. This entire band of frequencies may now be covered by only two tube types utilizing the features of the present invention. More specifically, two tubes utilizing the features of the present invention now adequately cover the frequency range from 470 megacycles to 1,000 megacycles.

The principal object of the present invention is to provide a novel high power high gain amplifier tube apparatus having exceptionally wide frequency tuning range which is especially useful, for example, in UHF-TV broadcasting and forward scatter communication.

One feature of the present invention is the provision of a novel tuner coolant apparatus wherein the coolant is supplied to and withdrawn from the tuner mechanism via a plurality of helical coolant tubes thereby accommodating translation of the tuning apparatus within the cavity.

Figure 1:
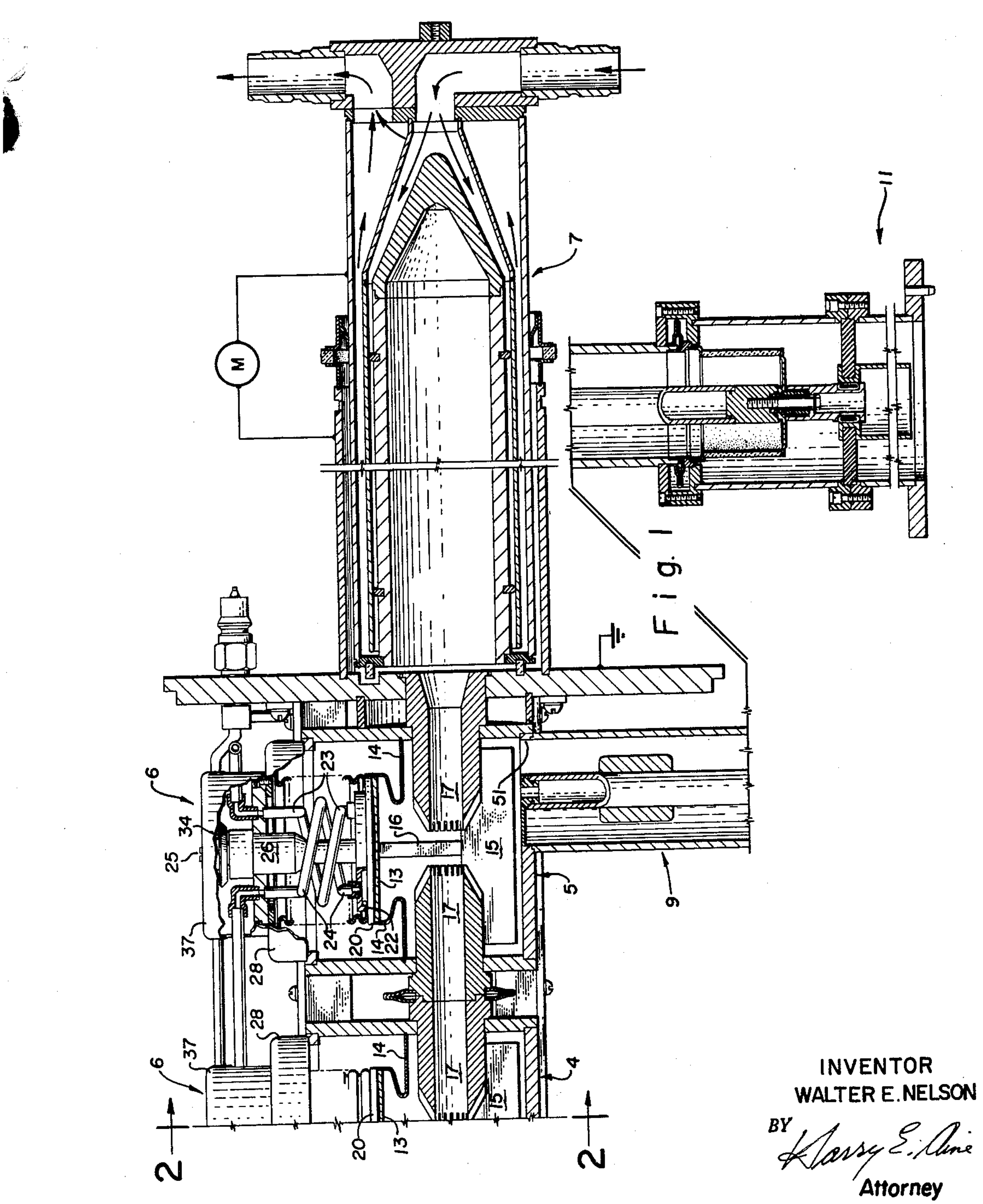
Figure 2:
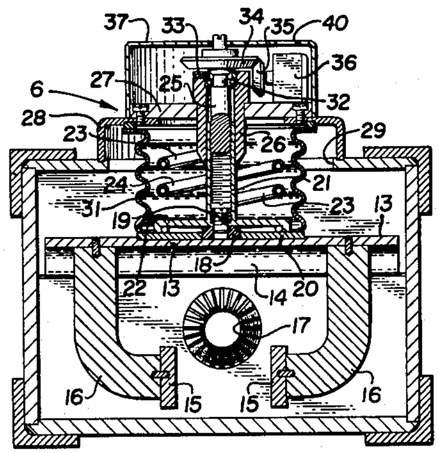

Other features and advantages of the present invention will become apparent upon a perusal of the following specification taken in connection with the accompanying drawings wherein, FIG. 1 is a longitudinal cross sectional view of the collector end portion of a multicavity klystron tube utilizing the tuner cooling feature of the present invention, and FIG. 2 is a transverse cross sectional view of a tunable cavity resonator taken along line 2—2 of FIG. 1.

Referring now to the drawings there is shown in FIGS. 1 and 2 the tuner cooling apparatus of the present invention. More specifically, cathode assembly, not shown, provides a source of electrons which are formed into a pencil-like beam and projected longitudinally of the tube apparatus. A plurality of rectangular cavity resonators are centrally apertured to allow the passage of the pencil-like beam of electrons therethrough.

The individual cavity resonators are tunable over a wide range via a plurality of novel tuner assemblies 6 which will be more fully described later in the specification. The beam after passing through the last or output cavity resonator 5 is collected in a collector assembly 7. The thermal energy generated by the impinging electrons within the collector 7 is carried away by a fluid coolant circulated through the collector assembly 7.

R.F. signal energy, which it is desired to amplify, is fed to the first or input cavity via a vacuum sealed coaxial connector, not shown. The signal energy velocity modulates the beam as it passed through the input cavity. The velocity modulation of the beam is transformed into current density modulation in the drift spaces between the input cavity and the first buncher cavity. Buncher resonators further velocity modulate the beam to produce greater current density modulation of the beam at the output cavity 5. The output cavity extracts R.F. energy from the current density modulated beam.

The output R.F. energy is coupled outwardly of the output resonator 5 via a vacuum sealed R.F. coaxial line 9 and fed to a suitable load, not shown, such as, for example, an antenna. The load is coupled to the coaxial line 9 via a novel coaxial connector assembly 11 which forms the subject matter of applicant's copending divisional application Serial No. 327,368, filed December 2, 1963. A magnetic solenoid, not shown, circumscribes the central part of the tube apparatus, containing the cavity resonators, for providing a strong axial magnetic field longitudinally of the tube for confining the pencil-like beam of electrons.

The novel wide range tuner apparatus 6 of the present invention is shown in FIGS. 1 and 2. More specifically, a conductive plate 13 as of, for example, copper has two thin conductive diaphragms 14 as of, for example, 0.015" thick OFHC copper sheet fixed thereto as by, for example, brazing along opposite sides of the plate 13. The other ends of the thin metallic diaphragms 14 are fixedly secured as by, for example, brazing to opposite walls of the rectangular cavity resonators.

Two rectangular capacity plates 15 are carried upon the extremities of two capacity support arms 16 which in turn are carried from the rectangular diaphragm plate 13 at opposite sides thereof and in quadrature with the diaphragms 14. The capacity plates 15 are longitudinally symmetrically disposed with respect to the re-entrant portions of the drift tubes 17 within the cavity resonators.

In addition the capacity support arms 16 are disposed in a plane midway of the cavity end walls such that the longitudinal axis of the capacity support arms are disposed substantially in a plane of symmetry within the cavity resonator. In this manner circulating currents tending to flow in the capacity support arms 16 are minimized and undesired modes of oscillation associated with the support arm are not excited which might otherwise produce undesired R.F. heating of the support arms 16 or of other members associated with the tuning structure 6.

The capacity plates 15 serve to vary predominately the capacitive loading between the mutually opposed and spaced apart re-entrant portions of the drift tubes 17. The diaphragm plate 13 with its associated diaphragms 14 serve to vary predominately the inductive parameter of the cavity resonator by displacing the magnetic field. Since the capacity plates 15 are disposed on the opposite side of the re-entrant portions of the drift tubes sections 17 from the tuner diaphragm plate 13, inward movement of the diaphragm plate 13 serves to decrease the inductance of the cavity and also to decrease the capacitance of the cavity. Conversely when the diaphragm plate 13 is moved outwardly of the cavity resonator the inductance is increased and the capacitance is increased. In this manner the combined capacitive and inductive tuner apparatus of the present invention has a greatly enhanced tuning effect because both the inductive and capacitive parameters of the cavity are being simultaneously varied in a complementary way to obtain large tuning effects with relatively small changes in the position of the tuning members.

A circular tuner cooling plate 20 as of, for example, (403) Monel is fixedly secured to the backside of the diaphragm plate 13 as by, for example, brazing. The tuner cooling plate 20 is centrally apertured and carries therefrom a raised internally threaded insert 18. A cap screw 19 threadedly mates with the insert and pulls a lip of a hollow internally threaded tuner drive shaft 21 down tightly against the insert 18. A centrally recessed circular flange 22 is carried at the end of the tuner drift shaft 21 and is also pulled tightly against the backside of the tuner cooling plate 17 by cap screw 19. The recessed portion of the circular flange 22 forms an annular coolant chamber. Two openings are cut through the flange 22 communicating with two hollow coolant tubes 23 and 24 respectively as of, for example, copper, which are wound in a helical configuration. One helical tube has a smaller diameter than the other and both are concentrically disposed of each other. One coolant carrying tube 23 serves to supply fluid coolant as of, for example, water to the hollow chamber between flange 22 and the tuner cooling plate 20. The other coolant carrying tube 24 serves to exhaust the hollow chamber and return the fluid to the coolant system. The helical configuration of the coolant tubes 23 and 24 serves to allow the tuning diaphragm plate 13 to enter into rectilinear translation within the cavity resonator without unduly stressing the coolant tube connections to the backside of the tuning apparatus.

A tuner drive screw 25 is externally threaded for mating with the internal threads of the hollow tuner drive shaft 21. The drive shaft 21 is captured against rotation by the provision of the diaphragms 14 which interconnect the cavity resonator wall and the diaphragm plate 13. The tuner drive screw 25 is captured against rectilinear translation in a manner which will be described later. Rotation of the tuner drive screw 25 causes the drive shaft 21 to travel inwardly and outwardly of the cavity resonator in variable accordance with the direction of rotation of the tuner drive screw 25.

A drive shaft bushing 26 as of, for example, brass is carried transversely of an apertured tuner drive base plate 27. The tuner base plate 27 is carried over a central opening in the bottom of a cavity adaptor cup 28 as of, for example, 403 Monel. The cavity adaptor cup 28 is sealed in a vacuum tight manner at its large open end over a circular tuner access port 29 in the cavity side wall.

A flexible metallic bellows 31 as of, for example stainless steel is fixedly secured in a vacuum tight manner at one end thereof to the inside surface of the tuner adaptor cup 28 and is sealed at its other end to the tuner cooling plate 20 as by, for example, brazing. The bellow 31 serve as a flexible vacuum seal for sealing the tuner actuating mechanism from the tuning elements disposed within the cavity resonator thereby permitting translation of these tuning elements within the cavity without destroying the vacuum integrity thereof.

A ball bearing race assembly 32 is carried at an internal shoulder of the tuner drive shaft bushing 26 substantially at the open end thereof via a plurality of set screws 33 radially extending inwardly of the tuner bushing 26. An external shoulder of the tuner drive screw 25 abuts the ball bearing assembly 32 and is thereby captured against translating outwardly of the tuner drive shaft bushing 26.

A bevel gear 34 is fixedly carried upon the tuner drive screw 25 substantially at one end thereof via a plurality of set screws. The bevel gear 34 mates with a second bevel gear 35 connected to a drive shaft communicating with digital indicating counter 36.

Since rotation of the tuner drive screw 25 is transformed directly into movement of the tuning elements within the cavity a count of the revolutions of the tuner drive screw 25 is a direct measure of the position of the tuning elements within the cavity and therefore a measure of the frequency of the cavity resonator. Tuning characteristic graphs may be prepared correlating the digital information with the resonant frequency of the cavity.

A cup-shaped tuner cover 37 covers over the bevel gears 34 and 35 and the digital indicating counter 36. The tuner cover 37 is fixedly secured to the tuner base plate 27 via a plurality of screws. The tuner cover 37 is centrally apertured to allow the tuner drive screw 25 to protrude slightly from the cover to facilitate access thereto. In addition a rectangular aperture 40 is provided in the tuner cover 37 opposite the digital indicating counter 36 to permit visual observation of the count. The tuner cover 37 is further apertured at the side to permit the coolant tubes 23 and 24 to pass therethrough communicating with remainder of the cooling system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency tube apparatus including, a cavity resonator adapted for electromagnetic interaction with a beam of charged particles passable therethrough, a movable member for varying the reactive parameters of said cavity resonator to change the resonant frequency thereof, a portion of said movable member defining a coolant chamber adapted to have a fluid coolant circulating therethrough to prevent overheating of said movable member in use, inlet and outlet means for providing fluid circulation through said coolant chamber and a first expansible helical coolant tube communicating with the coolant chamber of said movable member and adapted for circulating coolant fluid therethrough, whereby relatively large movements of said movable member are accommodated without producing excessive deflections of said coolant tube in use.

2. The apparatus according to claim 1 including a second helical coolant tube concentrically disposed of the axis of said first helical coolant tube and communicating with the coolant chamber defined by said movable member and adapted to circulate fluid coolant therethrough in use.

References Cited in the file of this patent

UNITED STATES PATENTS

| | | |
|---|---|---|
| 2,504,493 | Bull | Apr. 18, 1950 |
| 2,512,887 | Davis et al. | June 27, 1950 |
| 2,879,440 | Abraham et al. | Mar. 24, 1959 |
| 2,922,127 | Dench | Jan. 19, 1960 |
| 2,994,009 | Schmidt et al. | July 25, 1961 |